May 15, 1956     J. W. JACOBS     2,745,257
REFRIGERATING APPARATUS
Filed Aug. 26, 1953     2 Sheets-Sheet 1

INVENTOR.
James W. Jacobs
BY R. R. Candor
His Attorney

May 15, 1956

J. W. JACOBS 2,745,257

REFRIGERATING APPARATUS

Filed Aug. 26, 1953

INVENTOR.
James W. Jacobs
BY R. R. Candor
His Attorney

United States Patent Office 2,745,257
Patented May 15, 1956

2,745,257
REFRIGERATING APPARATUS

James W. Jacobs, Dayton, Ohio, assignor to General Motors Corporation, Detroit, Mich., a corporation of Delaware Application August 26, 1953, Serial No. 376,594

8 Claims. (Cl. 62—4)

This invention relates to refrigerating apparatus and more particularly to an automobile air conditioning system and the controls therefor.

It is an object of this invention to provide an automobile air conditioning system in which a single knob is used for not only starting and stopping the air conditioning equipment but also for controlling a number of items such as the air velocity, the air temperature and the introduction of fresh air into the passenger compartment.

More particularly, it is an object of this invention to provide a simple and inexpensive air conditioning control device which may be mounted on the dashboard of a passenger automobile and which selectively actuates a number of individual air conditioning controls by means of simple manipulations of the knob.

Further objects and advantages of the present invention will be apparent from the following description, reference being had to the accompanying drawings wherein a preferred embodiment of the present invention is clearly shown.

Figure 1:
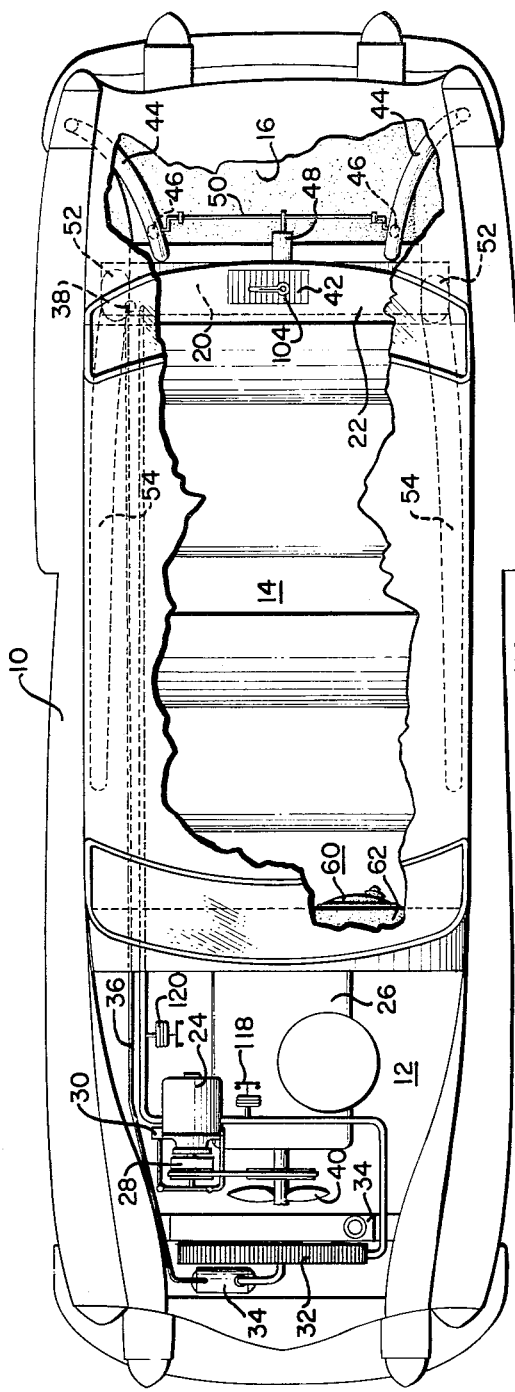
Figure 1 is a plan view with parts broken away showing a passenger automobile equipped with a preferred embodiment of the invention.

Referring now to the drawings wherein a preferred embodiment of the invention has been shown, reference numeral 10 designates a conventional passenger automobile having an engine compartment 12, a passenger compartment 14 and a luggage compartment 16. The air conditioning equipment which serves to cool the air for the passenger compartment 14 includes an evaporator 20 which, for purposes of illustration, has been shown located in the luggage compartment directly beneath the usual package shelf 22. The refrigeration liquefying system includes a compressor 24 which is adapted to be driven from the main car engine 26 through a clutch 28.

A solenoid 30 having two parallel coil sections 110 and 112 (see Figs. 1 and 2) serves to actuate the clutch 28. The clutch 28 is of the type shown in my copending application Ser. No. 365,593 filed July 2, 1953, and causes the compressor to be driven by the car engine 26 whenever the solenoid 30 is energized. The compressed refrigerant is discharged from the compressor into a condenser 32 which, for purposes of illustration, has been shown mounted in front of the main car engine radiator 34. The condensed refrigerant flows from the condenser 32 into a receiver 34 from whence the liquid refrigerant is supplied to the evaporator through a liquid line 36 in which there is mounted a thermostatic expansion valve 38 in accordance with standard practice.

A fan 40 which is directly driven by the main car engine serves to forcefully circulate air over the condenser and the engine radiator 34 at all times when the engine operates. Air to be conditioned is supplied to the air inlet side of the evaporator through a return air grill 42 located in the package shelf of the car and fresh outside air is supplied to the air inlet side of the evaporator through a pair of fresh air inlet ducts 44.

Fresh air inlet control dampers 46 are mounted in the ducts 44 so as to open and close the air passage in the fresh air ducts. A solenoid operator 48 is provided for controlling the fresh air dampers 46 through suitable linkage mechanism 50. The air dampers are of the normally closed type which only open when the solenoid is energized. A pair of evaporator blower elements 52 have been provided for discharging the conditioned air into the passenger compartment of the car through suitable air distributing ducts 54 which, for purposes of illustration, have been shown as extending substantially the full length of the passenger compartment on opposite sides of the same. The blowers 52 are the variable speed type which are adapted to have their speed controlled in a manner to be explained more fully hereinafter.

The air conditioning apparatus is normally controlled by the driver of the car and since the driver may wish to change the setting of the air conditioning equipment while driving the car, it is important that the controls for the air conditioning equipment be not only readily accessible to the operator but that a minimum number of control knobs or buttons be used. In the invention shown, the air conditioning control comprises a control assembly generally designated by the reference numeral 60 which is adapted to be mounted on the dashboard 62 of the car. The control comprises a single control knob 64 which is carried on the end of a shaft 66 which in turn is rotatably supported on a lever 68. Simple rotation of the knob 64 and the shaft 66 operates a rheostat 69 which controls the speed of the blower motor or motors.

Figure 3:
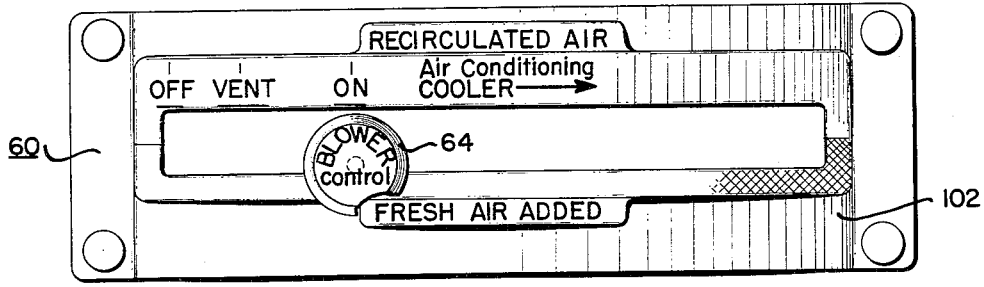
Figure 3 is a front elevational view showing the control knob and the control panel.
Figure 5:
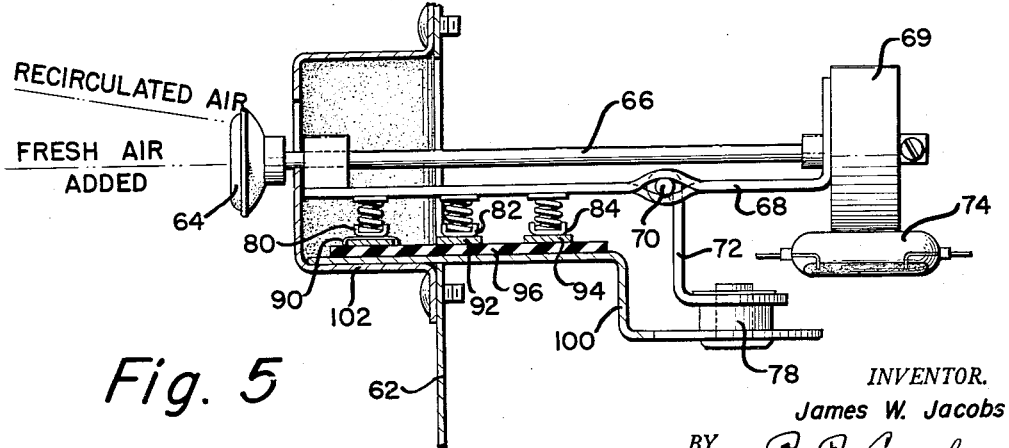
Figure 5 is a vertical sectional view taken at right angles to Figure 4.

The lever 68 is mounted for pivotal movement in a vertical plane about a horizontal axis 70 carried by a supporting element 72. A mercury switch 74 mounted on the inner end of the lever 68 serves to control the fresh air damper solenoid 48 and is so constructed and arranged that when the control knob 64 is in its lowermost position (as shown in Figs. 3 and 5) the fresh air dampers are open so as to admit a maximum amount of fresh air into the evaporator housing. The fresh air thus admitted is then discharged into the passenger compartment either with or without being cooled. By raising the knob 64, the lever 68 will pivot about its support 70 so as to tilt the mercury switch 74 and open the circuit to the damper control solenoid 48 and thereby cause closing of the dampers 46.

The support 72 is mounted for oscillation about a fixed pivot pin 78 whereby the control knob 64 and the lever 68 may be moved sideways as well as up and down. The lever 68 carries a plurality of spring pressed slidable contactors 80, 82 and 84 which are adapted to slidably engage the resistance wire 90, contact bar 92 and contact bar 94, respectively. The elements 90, 92 and 94 are carried by the insulating element 96 which in turn is carried by the stationary supporting bracket 100. The bracket 100 is secured to the escutcheon plate 102 which in turn is secured to the instrument panel 62.

Figure 4:
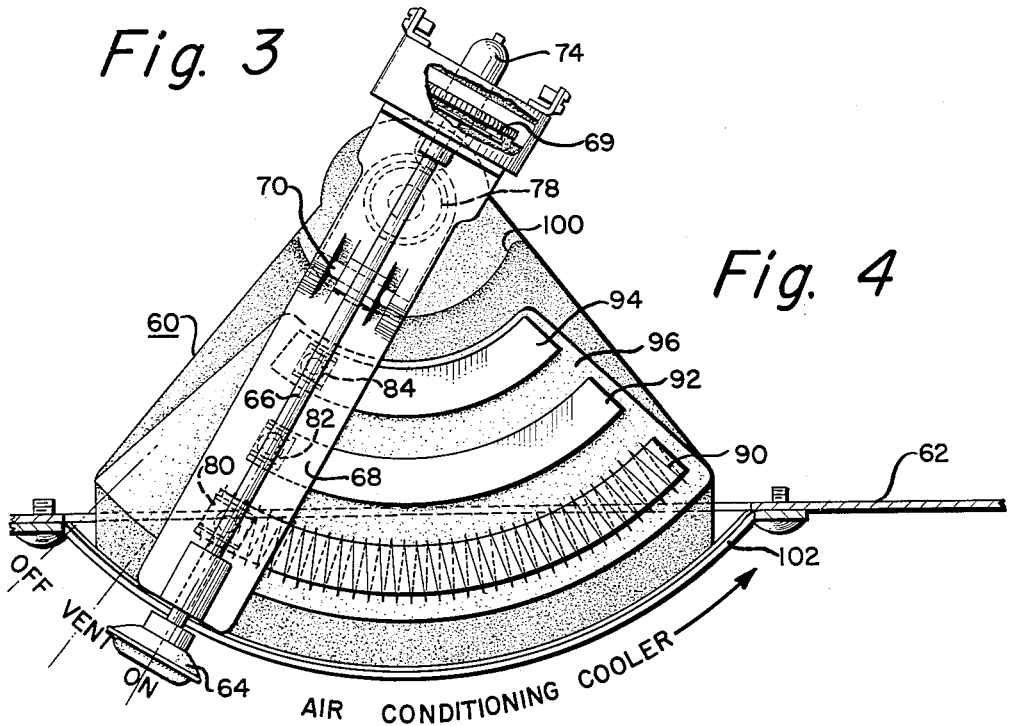
Figure 4 is a plan view with parts broken away showing a preferred embodiment of the control.

As shown in the drawings, when the knob 64 is moved to the far left or the "off" position, all of the air conditioning equipment is inoperative. As the control knob is moved from its "off" position to the position designated "ventilating position," the contactor 84 moves into engagement with the contact bar 94 (as shown in Fig. 4) so as to close the circuit to the evaporator blower motors and thereby cause these blower motors to circulate air within the passenger compartment and thereby ventilate the compartment. As explained hereinabove, the speed of the blowers is controlled by the rheostat 69 and this speed may be controlled by rotating the knob 64. As the knob 64 is moved from its ventilating position to that position designated as "on" position, the contactor 82 moves into engagement with the contact bar 92 so as to close the circuit to the main control thermostat 104 which for purposes of illustration has been shown mounted in the return air passage so as to respond to the temperature of the air in the passenger compartment of the car.

Figure 2:
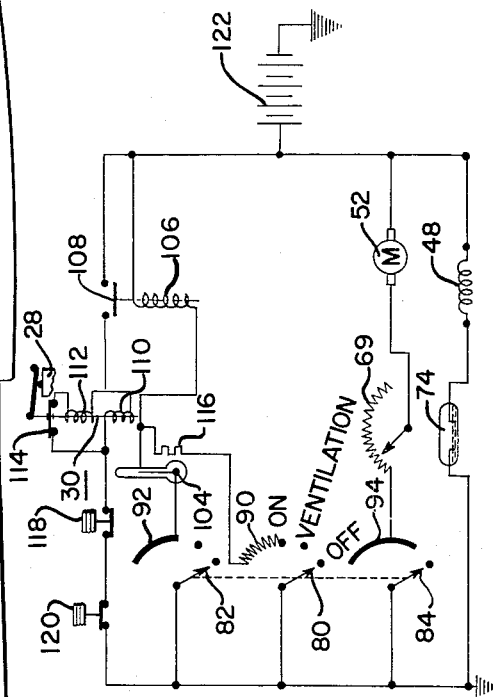
Figure 2 is a schematic wiring diagram showing the various electrical controls.

The thermostat 104 controls a solenoid 106 which operates a switch 108 arranged in series with the clutch operating solenoid coil sections 110 and 112 as shown in Figure 2. Whenever the air conditioning control knob is in the "on" position and the thermostat 104 indicates that cooling is required, the switch 108 will be held closed. When the switch 108 first closes, the solenoid coils 110 and 112 are both energized and serve to operate the clutch 28 and cause the compressor to be operated by the main car engine 26. Once the clutch is moved into engagement, the switch 114 is opened so as to deenergize the coil section 112 and thereby reduce the amount of current required by the clutch operating solenoid. The coil section 110 is strong enough to maintain the clutch in the engaged position once it is fully engaged so that the clutch will remain engaged until either the thermostat 104 opens the circuit to the solenoid 106 or the manually operated contactor 82 is moved out of engagement with the contact bar 92.

In order to adjust the temperature at which the thermostat 104 closes, a heater 116 has been provided in the circuit as shown. The heater 116 is arranged in series with a rheostat 90 and serves to apply a controlled amount of heat to the thermostat 104. When the heater applies little or no heat to the thermostat, the thermostat will respond directly to the air temperature, whereas as more heat is applied, the thermostat will close at higher air temperatures. As shown in Figures 2 and 4, the full amount of resistance is in circuit with the heater 116 when the control knob first moves into that position in which the contact 80 engages the resistance element 90. As the control knob moves further to the right, more resistance will be cut out, consequently, more heat will be added to the thermostat with the result that the further to the right one moves the control knob 64, the more cooling will take place.

There may be times when either the head pressure or the suction pressure in the refrigerating system becomes abnormally high or low, respectively, in which case the refrigerating equipment should be turned off so as to prevent damage to the compressor and so as to prevent inefficient operation of the air conditioning system. For this purpose a high pressure cut-out device 118 and a low pressure cut-out device 120 have been provided as shown in Figures 1 and 2. These cut-out devices serve to open the circuit to the clutch operating solenoid coils so as to disengage the clutch whenever abnormal pressures exist within the refrigeration system. The controls shown herein are adapted to be connected to the usual car battery 122.

While the form of embodiment of the invention as herein disclosed constitutes a preferred form, it is to be understood that other forms might be adopted, as may come within the scope of the claims which follow.

What is claimed is as follows:

1. In a single operative refrigerating system, a compressor, a condenser, an evaporator, refrigerant flow connections between said compressor, condenser and evaporator, a prime mover for said compressor, a clutch between said compressor and said prime mover, a control for said clutch, blower means for circulating air to be conditioned in thermal exchange relationship with said evaporator, a control for said blower means, duct means for conveying fresh air into thermal exchange relationship with said evaporator, a fresh air damper in said duct means, a control for said fresh air damper, and a common actuator for said controls, said controls comprising a first lever, means for pivotally supporting said first lever for oscillation about a given axis for exercising one of said controls, a second lever pivotally suported on said first lever for oscillation about a different axis for exercising another of said controls, and means including a control knob rotatably supported by said second lever for exercising still another control.

2. In a single operative refrigerating system, a compressor, a condenser, an evaporator, refrigerant flow connections between said compressor, condenser and evaporator, a prime mover for said compressor, a clutch between said compressor and said prime mover, a control for said clutch, blower means for circulating air to be conditioned in thermal exchange relationship with said evaporator, a control for varying the quantity of air circulated by said blower means, and a common actuator for said controls, said controls comprising a first lever, means for supporting said first lever for oscillation about a given axis, a second lever pivotally supported on said first lever for oscillation relative to said first lever and means including a master control knob supported for rotational movement relative to said second lever, said control for said clutch comprising means operated in response to pivotal movement of said first lever, said control for said blower means comprising a rheostat operated in response to rotation of said master control knob.

3. In a single operative refrigerating system for use in air conditioning the passenger compartment of an automobile, a compressor, a condenser, an evaporator, refrigerant flow connections between said compressor, condenser and evaporator, a prime mover for said compressor, a clutch between said compressor and said prime mover for starting and stopping said compressor independently of operation of said prime mover, a control for said clutch, blower means for circulating air to be conditioned in thermal exchange relationship with said evaporator, a control for varying the speed of said blower means, duct means for conveying fresh air into thermal exchange relationship with said evaporator, a fresh air damper in said duct means, a control for said fresh air damper, and a common actuator for said controls, said actuator comprising a rotatable shaft arranged to operate said blower control means in response to rotation of such shaft, a support for said rotatable shaft, means for pivotally mounting said support, pivotal movement of said support serving to operate said damper control means, means for pivotally supporting said shaft support, pivotal movement of said last named means serving to control said clutch control means.

4. In a single operative refrigerating system, a compressor, a condenser, an evaporator, refrigerant flow connections between said compressor, condenser and evaporator, a prime mover, power transmitting means between said prime mover and said compressor including a clutch, blower means for circulating air to be conditioned in thermal exchange relationship with said evaporator, duct means for conveying fresh air into thermal exchange relationship with said evaporator, a fresh air damper in said duct means, a master control element, means responsive to rotation of said control element for varying the speed of said blower means, means responsive to oscillation of said control element in one plane for controlling said fresh air damper, and means responsive to oscillation of said control element in another plane for controlling the operation of said clutch.

5. In a single operative refrigerating system, a compressor, a condenser, an evaporator, refrigerant flow connections between said compressor, condenser and evaporator, a prime mover, power transmitting means between said prime mover and said compressor including a clutch, blower means for circulating air to be conditioned in thermal exchange relationship with said evaporator, duct means for conveying fresh air into thermal exchange relationship with said evaporator, a fresh air damper in said duct means, a master control element, means responsive to rotation of said control element for varying the speed of said blower means, means responsive to oscillation of said control element in one plane for controlling said fresh air damper, and means responsive to oscillation of said control element in another plane for controlling the operation of said clutch, said clutch control means including a thermostat operable in at least one position of said master control element to respond to the refrigeration requirements for automatically operating said clutch.

6. In a single operative refrigerating system, a compressor, a condenser, an evaporator, refrigerant flow connections between said compressor, condenser and evaporator, a prime mover, power transmitting means between said prime mover and said compressor including a clutch, blower means for circulating air to be conditioned in thermal exchange relationship with said evaporator, duct means for conveying fresh air into thermal exchange relationship with said evaporator, a fresh air damper in said duct means, a master control element, means responsive to rotation of said control element for varying the speed of said blower means, means responsive to oscillation of said control element in one plane for controlling said fresh air damper, and means responsive to oscillation of said control element in another plane for controlling the operation of said clutch, said clutch control means including a thermostat operable in at least one position of said master control element to respond to the refrigeration requirements for automatically operating said clutch, and means for adjusting the temperature at which said thermostat responds.

7. In a single operative refrigerating system, a compressor, a condenser, an evaporator, refrigerant flow connections between said compressor, condenser and evaporator, a prime mover, power transmitting means between said prime mover and said compressor including a clutch, blower means for circulating air to be conditioned in thermal exchange relationship with said evaporator, duct means for conveying fresh air into thermal exchange relationship with said evaporator, a fresh air damper in said duct means, a master control element, means responsive to rotation of said control element for varying the speed of said blower means, means responsive to oscillation of said control element in one plane for controlling said fresh air damper, and means responsive to oscillation of said control element in another plane for controlling the operation of said clutch, said clutch control means including a thermostat operable in at least one position of said master control element to respond to the refrigeration requirements for automatically operating said clutch, and means for adjusting the temperature at which said thermostat responds, said last named means being adjusted by movement of said master control element.

8. In a single operative refrigerating system, a compressor, a condenser, an evaporator, refrigerant flow connections between said compressor, condenser and evaporator, a prime mover, power transmitting means between said prime mover and said compressor including a clutch, blower means for circulating air to be conditioned in thermal exchange relationship with said evaporator, duct means for conveying fresh air into thermal exchange relationship with said evaporator, a fresh air damper in said duct means, a master control element, means responsive to rotation of said master control element for varying the speed of said blower means, means responsive to oscillation of said master control element in one plane for controlling said fresh air damper, means responsive to oscillation of said master control element in another plane for controlling the operation of said clutch, said clutch control means including a thermostat arranged to respond to the refrigeration requirements for automatically operating said clutch, and means responsive to movement of said control means for varying the temperature at which said temperature responsive means operate said clutch.

References Cited in the file of this patent

UNITED STATES PATENTS

| Number | Name | Date |
|---|---|---|
| 1,872,380 | Woods | Aug. 16, 1932 |
| 2,032,572 | Hammers | Mar. 3, 1936 |
| 2,187,397 | Goggins | Jan. 16, 1940 |
| 2,264,821 | Zukoski | Dec. 2, 1941 |
| 2,346,017 | Errath | Apr. 4, 1944 |
| 2,361,855 | McCormack | Oct. 31, 1944 |
| 2,495,350 | Smith | Jan. 24, 1950 |
| 2,569,009 | Kuempel | Sept. 25, 1951 |
| 2,636,356 | Ryan | Apr. 28, 1953 |
| 2,656,685 | Borgerd | Oct. 27, 1953 |